(12) United States Patent
Koo et al.

(10) Patent No.: US 10,638,132 B2
(45) Date of Patent: Apr. 28, 2020

(54) METHOD FOR ENCODING AND DECODING VIDEO SIGNAL, AND APPARATUS THEREFOR

(71) Applicant: LG Electronics Inc., Seoul (KR)

(72) Inventors: Moonmo Koo, Seoul (KR); Bumshik Lee, Seoul (KR); Sehoon Yea, Seoul (KR); Kyuwoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/767,962

(22) PCT Filed: Oct. 17, 2016

(86) PCT No.: PCT/KR2016/011652
§ 371 (c)(1),
(2) Date: Apr. 12, 2018

(87) PCT Pub. No.: WO2017/065592
PCT Pub. Date: Apr. 20, 2017

(65) Prior Publication Data
US 2018/0302620 A1  Oct. 18, 2018

Related U.S. Application Data

(60) Provisional application No. 62/241,760, filed on Oct. 15, 2015.

(51) Int. Cl.
*H04N 19/119*  (2014.01)
*H04N 19/147*  (2014.01)
(Continued)

(52) U.S. Cl.
CPC ......... *H04N 19/119* (2014.11); *H04N 19/147* (2014.11); *H04N 19/157* (2014.11);
(Continued)

(58) Field of Classification Search
CPC .. H04N 19/119; H04N 19/147; H04N 19/157; H04N 19/159; H04N 19/176; H04N 19/61; H04N 19/90; H04N 19/96
(Continued)

(56) References Cited

U.S. PATENT DOCUMENTS

2013/0136175 A1   5/2013  Wang et al.
2013/0243083 A1*  9/2013  Sezer ............... H04N 19/14
                                                         375/240.02

FOREIGN PATENT DOCUMENTS

KR   10-2012-0081453 A   7/2012
KR   10-2015-0077390 A   7/2015
(Continued)

OTHER PUBLICATIONS

Chen, et al.: "Adaptive Linear Prediction for Block-based Lossy Image Coding", XP031629140, 16th IEEE International Conference on Image Processing (ICIP), Nov. 7, 2009, pp. 2833-2836.

*Primary Examiner* — Patricia I Young
(74) *Attorney, Agent, or Firm* — Dentons US LLP

(57) ABSTRACT

The present invention provides a method for encoding a video signal comprising the steps of: performing block division with respect to a target unit of the video signal, wherein the block division is performed on the basis of square division and/or non-square division; determining the optimal block partition on the basis of a rate distortion cost, when the target unit is divided into a plurality of non-square blocks; and performing CNT prediction coding on the non-square blocks resulting from the optimal block partition, wherein the CNT prediction coding involves performing prediction using all previously decoded pixel values.

15 Claims, 15 Drawing Sheets

(51) Int. Cl.
   *H04N 19/157*   (2014.01)
   *H04N 19/159*   (2014.01)
   *H04N 19/176*   (2014.01)
   *H04N 19/61*    (2014.01)
   *H04N 19/90*    (2014.01)
   *H04N 19/96*    (2014.01)

(52) U.S. Cl.
   CPC ......... *H04N 19/159* (2014.11); *H04N 19/176* (2014.11); *H04N 19/61* (2014.11); *H04N 19/90* (2014.11); *H04N 19/96* (2014.11)

(58) Field of Classification Search
   USPC .................................................. 375/240.12
   See application file for complete search history.

(56) References Cited

FOREIGN PATENT DOCUMENTS

| | | |
|---|---|---|
| KR | 10-2015-0090803 A | 8/2015 |
| WO | 2015/068051 A2 | 5/2015 |

* cited by examiner

[FIG. 1]
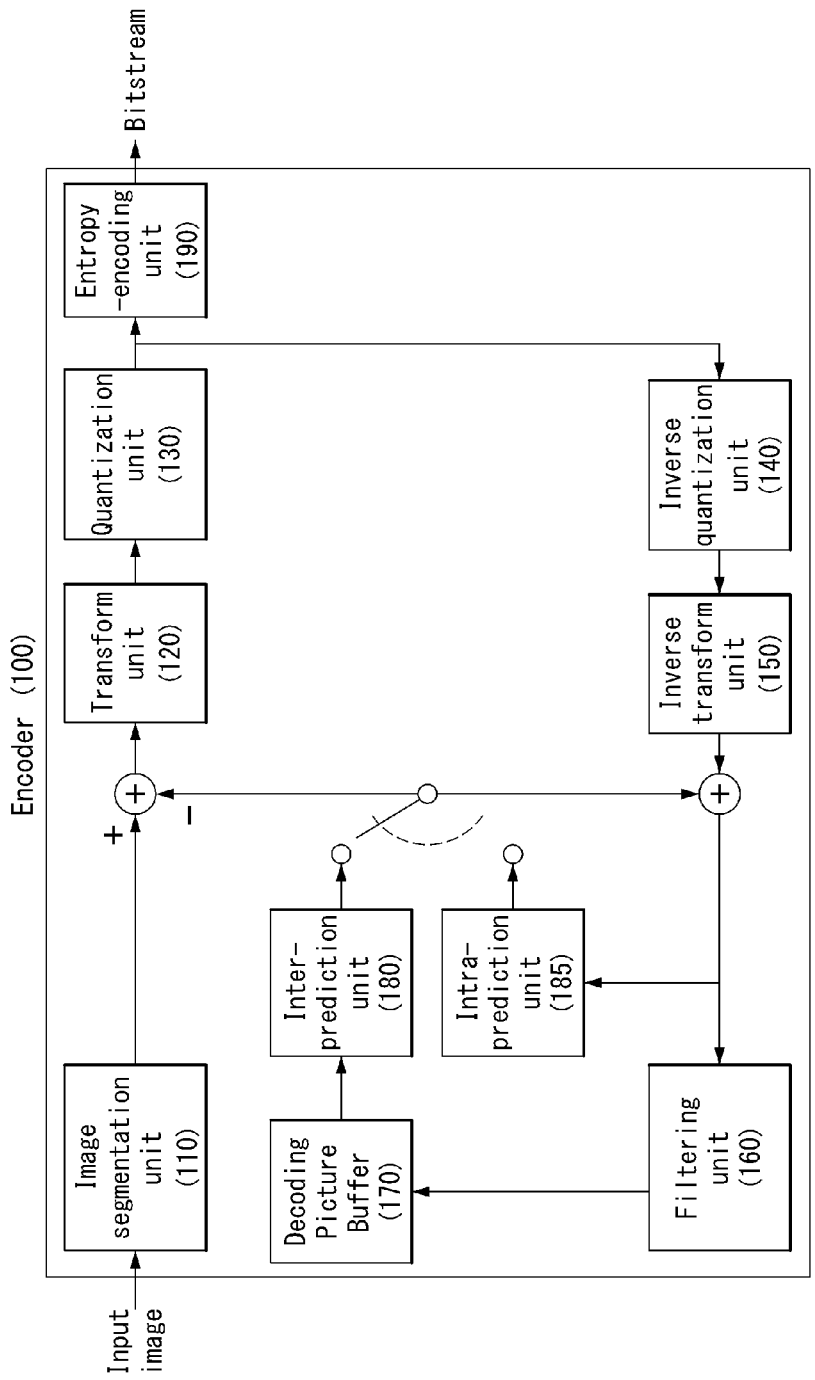

[FIG. 2]
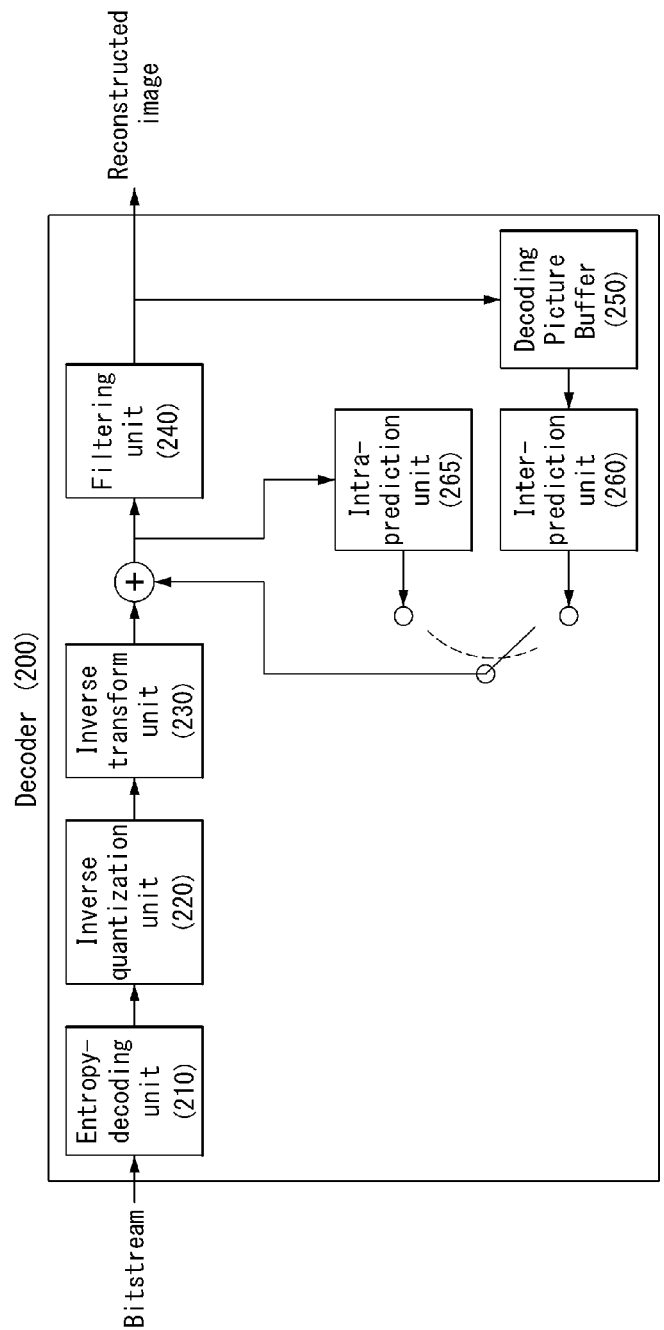

[FIG. 3]
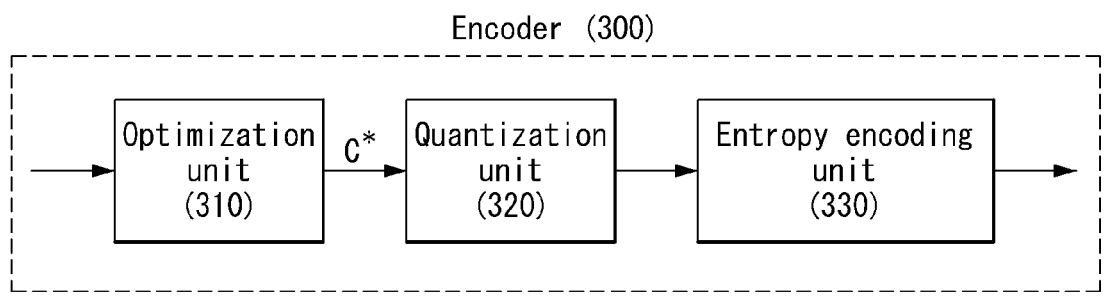

[FIG. 4]
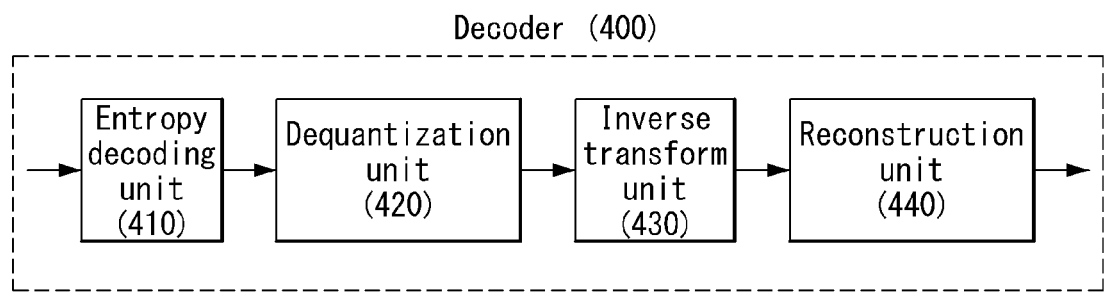

[FIG. 5]
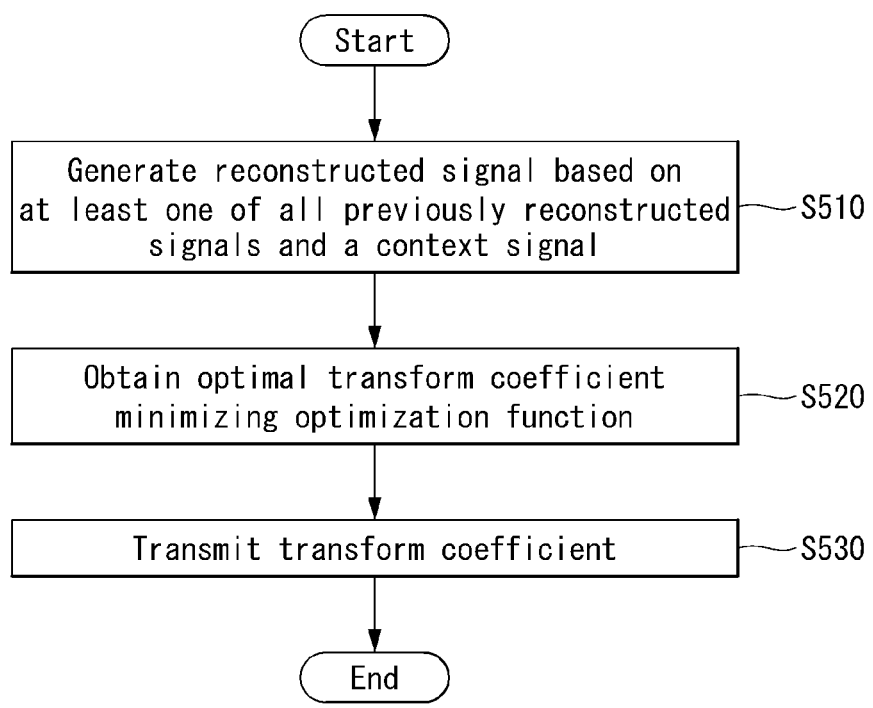

[FIG. 6]
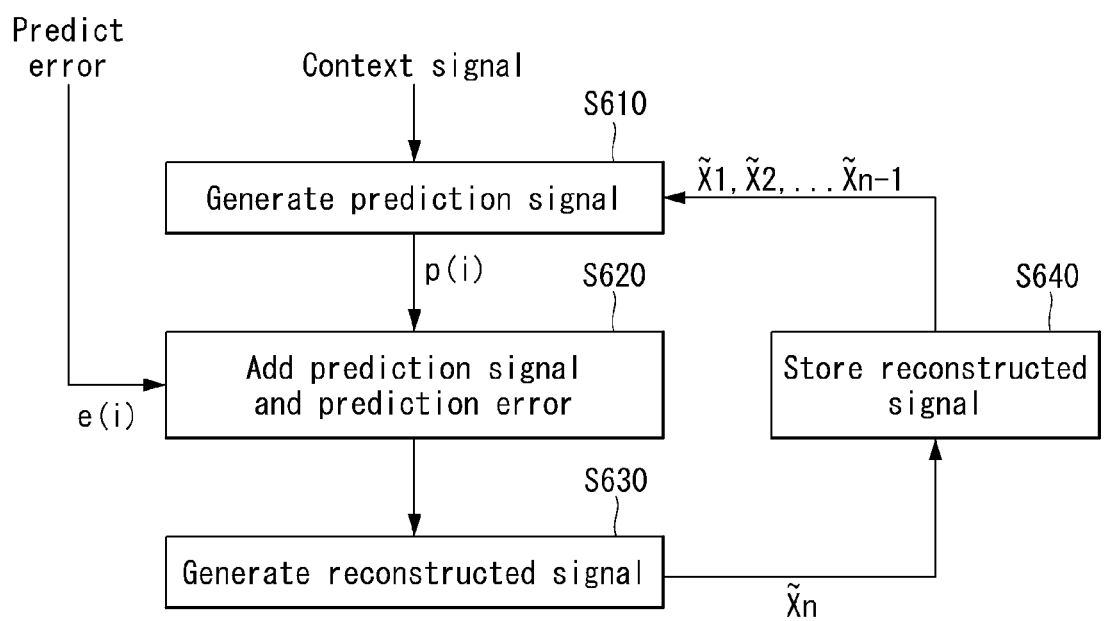

[FIG. 7]
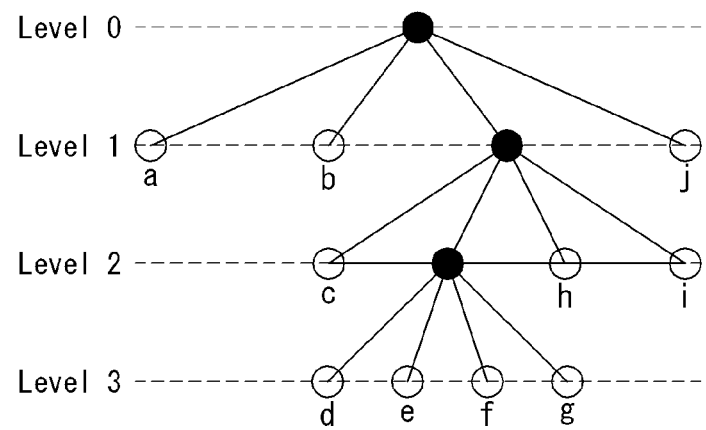
(a)
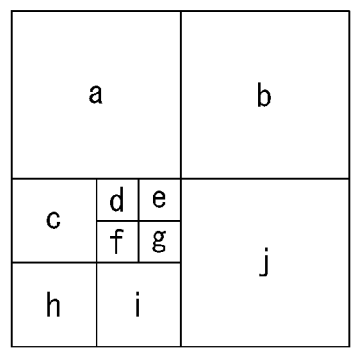
(b)

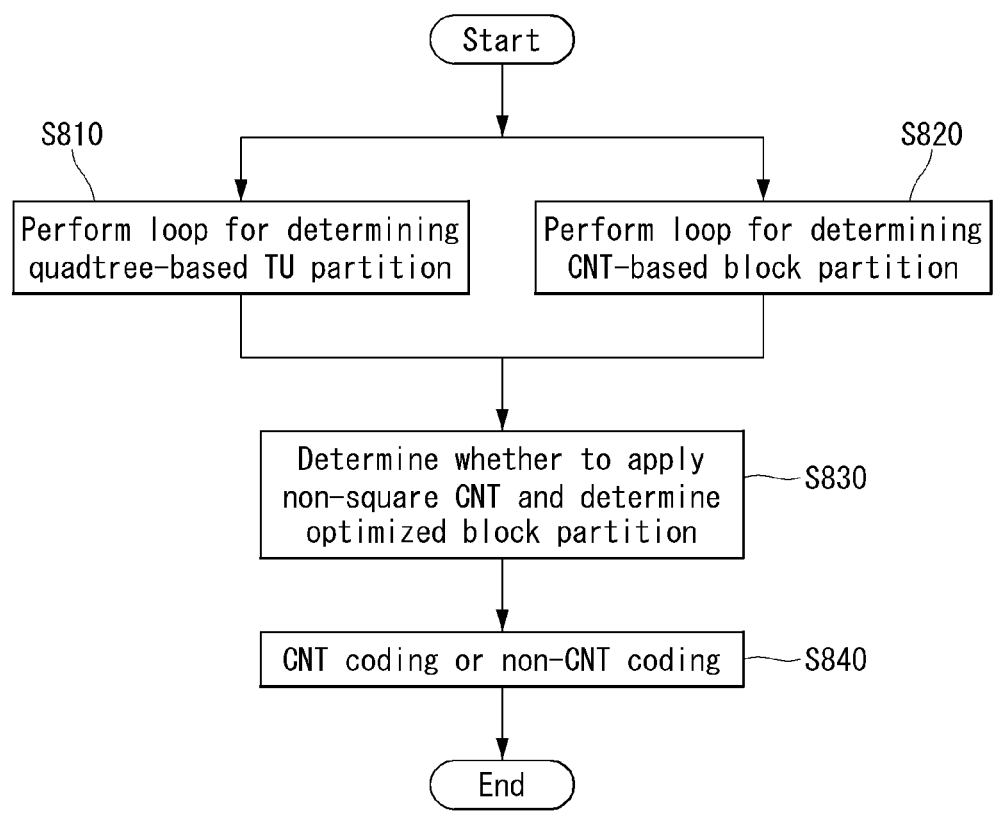
[FIG. 8]

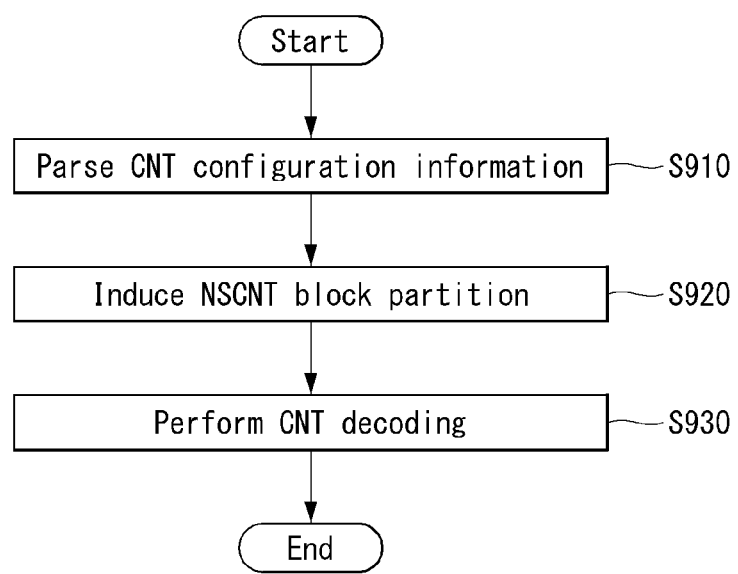
[FIG. 9]

[FIG. 10]
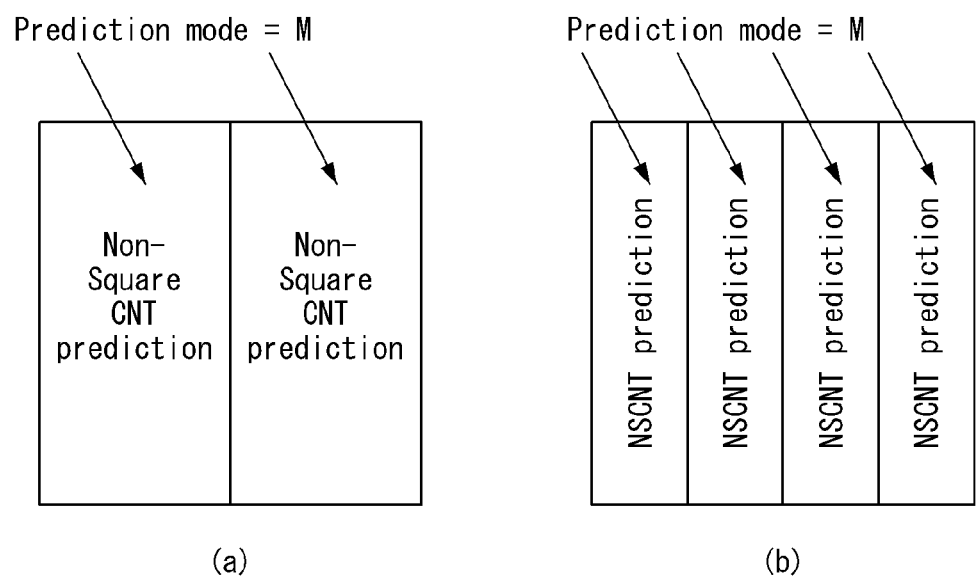

[FIG. 11]

Prediction mode = $M_1$    Prediction mode = $M_2$    $M_1$    $M_2$    $M_3$    $M_4$ Non-Square CNT prediction | Non-Square CNT prediction NSCNT prediction | Intra prediction | NSCNT prediction | Intra prediction (a)          (b)

[FIG. 12]
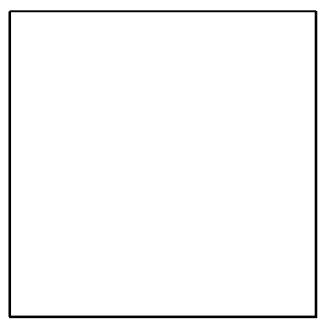
(a)
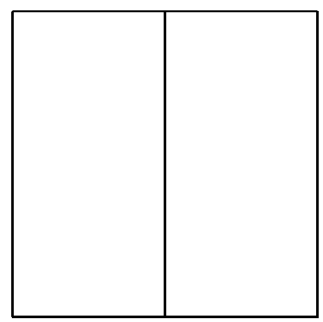
(b)
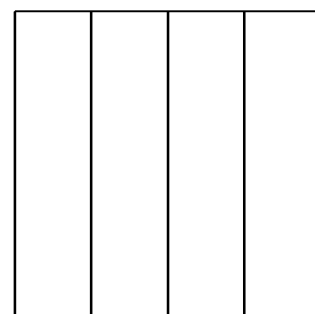
(c)
(d)
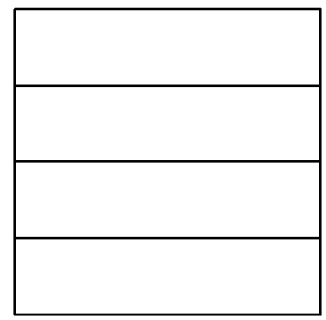
(e)

[FIG. 13]
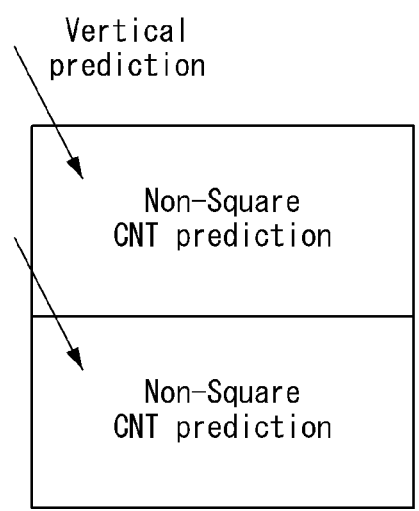
(a)
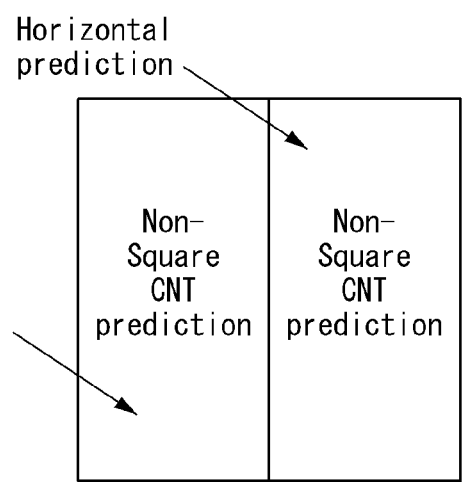
(b)

[FIG. 14]
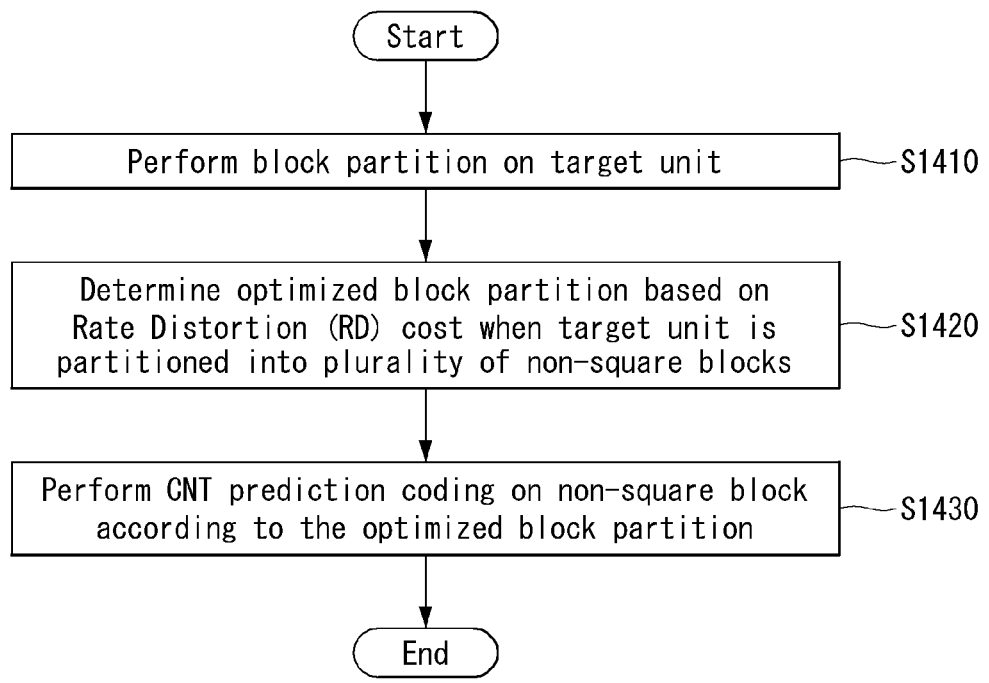

[FIG. 15]
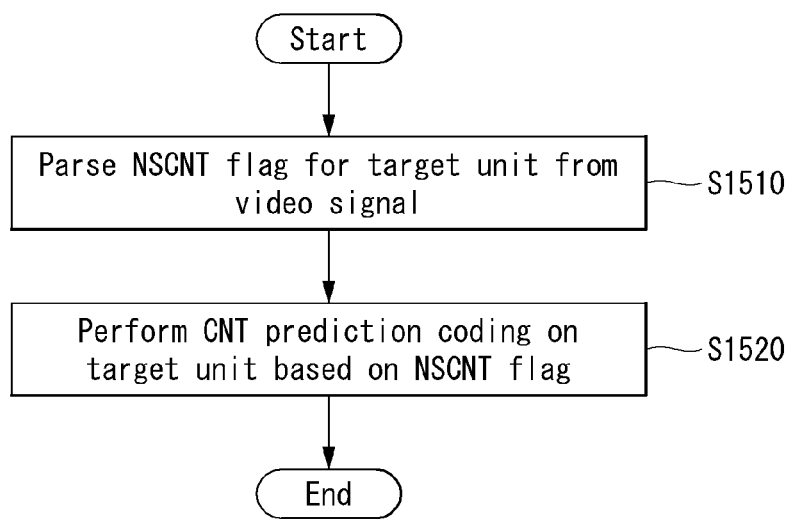

METHOD FOR ENCODING AND DECODING VIDEO SIGNAL, AND APPARATUS THEREFOR

CROSS-REFERENCE TO RELATED APPLICATIONS

This application is the National Stage filing under 35 U.S.C. 371 of International Application No. PCT/KR2016/011652, filed on Oct. 17, 2016, which claims the benefit of U.S. Provisional Applications No. 62/241,760, filed on Oct. 15, 2015, the contents of which are all hereby incorporated by reference herein in their entirety.

TECHNICAL FIELD

The present invention relates to a method for encoding and decoding a video signal and an apparatus therefore and, more particularly, to a method for processing a video signal based on a Non-Square Conditionally Non-linear Transform (NSCNT) coding technique and an apparatus therefor.

BACKGROUND ART

Compression coding means a set of signal processing techniques for sending digitalized information through a communication line or storing digitalized information in a form suitable for a storage medium. Media, such as videos, images, and voice may be the subject of compression coding. In particular, a technique for performing compression coding on videos is called video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

In particular, prediction coding cannot utilize any statistical dependency when it comes to obtaining a prediction error sample, and transformation coding needs to depend on only the first available data to acquire a prediction value of a sample. For this reason, a prediction signal is hard to have a high quality and this problem needs to be overcome efficiently.

DISCLOSURE

Technical Problem

The present invention provides a method for performing prediction using the most recently reconstructed data.

The present invention provides a method for processing a target unit using a Conditionally Non-linear Transform (CNT) coding technique.

The present invention provides a method for processing a target unit using a Non-Square Conditionally Noon-linear Transform (NSCNT) coding technique.

The present invention provides a method for applying advantages of each coding techniques based on combination of new prediction/transform coding.

The present invention provides a method for processing additional information in a CNT coding technique.

The present invention provides a method for defining or transmitting CNT flag information.

Technical Solution

The present invention provides a method for applying Conditionally Non-linear Transform (CNT) coding on a non-square block.

The present invention provides a method for applying a CNT prediction mode on a non-square block when one square block is partitioned into two or more non-square blocks.

The present invention provides a method for applying a prediction mode of a different coding technique on a plurality of non-square blocks in a square block.

The present invention provides a method for fixing a different non-square block partition for each prediction mode so as to apply corresponding non-square CNT or separately transmit rectangular block partition information.

The present invention provides a method for performing CNT prediction on a non-square block by vertically partitioning a block for horizontal directional prediction and horizontally partitioning a block for vertical directional prediction.

The present invention provides a method for applying CNT coding on a non-square Transform Unit (TU).

The present invention provides a method for partitioning blocks, to which Non-Square Conditional Non-linear Transform (NSCNT) is applied, according to size of a target block.

The present invention provides a CNT coding method that considers correlation between pixels in a transform domain.

The present invention provides a method for processing a video signal using a CNT coding technique.

The present invention provides a method for obtaining an optimized transform coefficient by considering all previously reconstructed signals when performing a prediction process.

Advantageous Effects

When performing coding by applying Conditionally Non-linear Transform (CNT) on each block configuring a still image or a video, the present invention partition a corresponding block in a non-square shape and apply non-square CNT to each partitioned block, thereby remarkably reducing an amount of compressed data of the image.

In addition, the present invention may efficiently code a CNT flag, indicating whether a CNT is applied, when applying a CNT to a still image or a video, thereby reducing a CNT flag transmission amount and accordingly enhancing compression efficiency.

In addition, the present invention may utilize a CNT coding technique that considers correlation between pixels in a transform domain, thereby enhancing compression efficiency.

In addition, the present invention may combine prediction coding and transform coding, thereby achieving advantages of each of the coding techniques. That is, by using all previously reconstructed signals, it is possible to perform more sophisticated and enhanced prediction and utilize statistical dependency of a prediction error sample. In addition, coding is performed by simultaneously applying prediction and transform with respect to a single dimension, thereby efficiently coding a high quality image including a non-smooth non-stationary signal.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 is schematic block diagrams of an encoder to which Conditionally Non-linear Transform (CNT) coding technique is applied according to an embodiment of the present invention.

FIG. 4 is schematic block diagrams of a decoder to which Conditionally Non-linear Transform (CNT) coding technique is applied according to an embodiment of the present invention.

FIG. 5 is a schematic flowchart illustrating a CNT coding technique according to an embodiment of the present invention.

FIG. 6 is a flowchart illustrating a method for generating an optimal prediction signal based on a CNT coding technique according to an embodiment of the present invention.

FIG. 7 is a diagram illustrating a partition structure of a coding unit according to an embodiment of the present invention.

FIG. 8 is a flowchart illustrating a method for determining whether non-square CNT is applied and determining an optimal block partition according to an embodiment of the present invention.

FIG. 9 is a flowchart illustrating a method for decoding a video signal by applying non-square CNT according to an embodiment of the present invention.

FIG. 10 is a diagram illustrating a method for performing prediction by applying the same prediction mode to non-square blocks according to an embodiment of the present invention.

FIG. 11 is a diagram illustrating a method for performing prediction by applying different prediction modes to non-square blocks according to an embodiment of the present invention.

FIG. 12 is a diagram illustrating a method for partitioning one square block into two or more non-square blocks according to an embodiment of the present invention.

FIG. 13 is a diagram illustrating a method for partitioning one square block into two or more non-square blocks in a prediction direction according to an embodiment of the present invention.

FIG. 14 is a flowchart illustrating a method for performing CNT prediction coding on non-square blocks according to an embodiment of the present invention.

FIG. 15 is a flowchart illustrating a method for performing CNT prediction coding based on a non-square CNT flag according to an embodiment of the present invention.

BEST MODE

The present invention provides a method for encoding a video signal, including: performing block partition on a target unit of the video signal, wherein the block partition is performed based on at least one of a square partition or a non-square partition; determining an optimal block partition based on a Rate Distortion (RD) cost when the target unit is partitioned into a plurality of non-square blocks; and performing Conditionally Non-linear Transform (CNT) prediction coding on a non-square block partitioned based on the optimal block partition, wherein the CNT prediction coding comprises performing prediction using all previously decoded pixel values.

In the present invention, a same prediction mode may be applied to the plurality of non-square blocks.

In the present invention, different prediction modes may be applied to at least two of the plurality of non-square blocks.

In the present invention, the optimal block partition may be determined based on a prediction direction or a prediction mode.

In the present invention, when the prediction direction or the prediction mode represents a horizontal direction, the optimal block partition may be determined to be a vertical directional block partition, and, when the prediction direction or the prediction mode represents a vertical direction, the optimal block partition may be determined to a horizontal directional block partition.

In the present invention, the method may further include signaling a CNT flag which indicates whether a CNT prediction coding is performed on the non-square block.

In the present invention, the non-square CNT flag may be signaled in at least one level of a Sequence Parameter Set (SPS), a Picture Parameter Set (PPS), a picture, a Coding Tree Unit (CTU), a Coding Unit (CU), a Prediction Unit (PU), or a block.

The present invention provides a method for decoding a video signal, including: parsing a non-square Conditionally Non-linear Transform (CNT) flag for a target unit from a video signal, wherein the non-square CNT flag indicates whether a CNT prediction coding is performed on a non-square block; and performing a CNT prediction coding on the target unit based on the non-square CNT flag, wherein the target unit is composed of a plurality of non-square blocks, wherein the CNT prediction coding comprises performing prediction using all previously decoded pixel values according to CNT prediction modes.

In the present invention, the method may further include parsing CNT configuration information, which is necessary to perform CNT coding, from the video signal, wherein the CNT configuration information comprises at least one of block partition information in which non-square CNT is applied, a CNT flag indicating whether CNT is applied, transmission unit information for transmitting a CNT flag, or a CNT prediction mode set indicating a CNT prediction mode.

The present invention provides an apparatus for encoding a video signal, including: an image segmentation unit configured to perform a block partition on a target unit of the video signal, and, when the target unit is partitioned into a plurality of non-square blocks, determine an optimal block partition based on Rate Distortion (RD) cost; and a prediction unit configured to perform Conditionally Non-linear Transform (CNT) prediction coding on a non-square block partitioned based on the optimal block partition, wherein the block partition is performed based on at least one of a square partition or a non-square partition, and wherein the CNT prediction coding comprises performing prediction using all previously decoded pixel values.

The present invention provides an apparatus for decoding a video signal, including: a parsing unit configured to parse a non-linear Conditionally Non-linear Transform (CNT) flag for a target unit, which is composed of a plurality of non-square blocks, from the video signal; and a prediction unit configured to perform CNT prediction coding on the target unit based on the non-square CNT flag, wherein the non-square CNT flag indicates whether a CNT prediction coding is performed on a non-square block, and wherein the CNT prediction coding comprises performing a prediction using all previously decoded pixel values according to CNT prediction modes.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be interpreted as being based on the name of a term used in a corresponding description of this specification, but should be interpreted by checking the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process.

Furthermore, the concepts and methods of embodiments described in this specification may be applied to other embodiments, and a combination of the embodiments may be applied without departing from the technical spirit of the present invention although they are not explicitly all described in this specification.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

According to the present invention, the process unit may be a square block or a non-square block.

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The intra predictor 185 may be classified mainly into prediction mode coding and residual signal coding. In the case of coding a prediction mode, a prediction mode of a neighboring block may be used as a prediction value for a prediction mode of the current block. Thus, the more accurate the prediction mode of neighboring blocks, the more accurate the prediction for a prediction mode of the current block may be.

The prediction signal generated via the inter-prediction unit 180 or the intra-prediction unit 185 may be used to generate the reconstructed signal or used to generate the residual signal.

In addition, the inter prediction unit 180 or the intra prediction unit 185 may generate a prediction signal using all previously reconstructed signals based on a CNT coding technique to which the present invention is applied.

FIG. 2 shows a schematic block diagram of a decoder for decoding a video signal, in accordance with one embodiment of the present invention.

Referring to FIG. 2, a decoder 200 may include a parsing unit(not shown), an entropy-decoding unit 210, an inverse quantization unit 220, an inverse transform unit 230, a filtering unit 240, a decoded picture buffer (DPB) 250, an inter-prediction unit 260, an intra-prediction unit 265, and a reconstruction unit(not shown).

A reconstructed video signal output from the decoder 200 may be reproduced using a reproducing device.

The decoder 200 may receive a video signal output from the encoder 100 of FIG. 1, and parse syntax elements from the video signal through a parsing unit (not shown). The parsed signal may be entropy decoded through the entropy decoding unit 210 or may be transmitted to another function unit.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3 and 4 are schematic block diagrams of an encoder and a decoder to which Conditionally Non-linear Transform (CNT) coding technique is applied according to an embodiment of the present invention.

In the existing codec, if transform coefficients for N data are to be obtained, N prediction data is extracted from the N original data at once, and transform coding is then applied to the obtained N residual data or a prediction error. In such a case, the prediction process and the transform process are sequentially performed.

However, if prediction is performed on video data including N pixels in a pixel unit using the most recently reconstructed data, the most accurate prediction results may be obtained. For this reason, to sequentially apply prediction and transform in an N-pixel unit may not be said to be an optimized coding method.

Meanwhile, in order to obtain the most recently reconstructed data in a pixel unit, residual data must be reconstructed by performing inverse transform on already obtained transform coefficients, and then the reconstructed residual data must be added to prediction data. However, in the existing coding method, it is impossible to reconstruct data in a pixel unit itself because transform coefficients can be obtained by applying transform only after prediction for N data is ended.

Accordingly, the present invention proposes a method of obtaining a transform coefficient using a previously reconstructed signal and a context signal.

The encoder 300 of FIG. 3 includes an optimization unit 310, a quantization unit 320, and an entropy encoding unit 330. The decoder 400 of FIG. 4 includes an entropy decoding unit 410, a dequantization unit 420, an inverse transform unit 430, and a reconstruction unit 440.

Referring to the encoder 300 of FIG. 3, the optimization unit 310 obtains an optimized transform coefficient. The optimization unit 310 may use the following embodiments in order to obtain the optimized transform coefficient.

In order to illustrate an embodiment to which the present invention may be applied, first, a reconstruction function for reconstructing a signal may be defined as the following equation 1.

$$\tilde{x} = R(c, y) \qquad \text{[Equation 1]}$$

In Equation 1, $\tilde{x}$ denotes a reconstructed signal, c denotes a decoded transform coefficient, and y denotes a context signal. $R(c, y)$ denotes a nonlinear reconstruction function using c and y in order to generate a reconstructed signal.

In one embodiment to which the present invention is applied, there is provided a method of generating an advanced non-linear predictor in order to obtain an optimized transform coefficient.

In the present embodiment, a prediction signal may be defined as a relation between previously reconstructed values and a transform coefficient. That is, the encoder and the decoder to which the present invention is applied may generate an optimized prediction signal by taking into consideration all of previously reconstructed signals when performing a prediction process. Furthermore, a non-linear prediction function may be applied as a prediction function for generating a prediction signal.

Accordingly, each of decoded transform coefficients affects the entire reconstruction process and enables control of a prediction error included in a prediction error vector. For example, the prediction error signal may be defined as the following equation 2.

$$e = Tc \qquad \text{[Equation 2]}$$

In this case, e indicates a prediction error signal, c indicates a decoded transform coefficient, and T indicates a transform matrix.

In this case, the reconstructed signal may be defined as the following equation 3.

$$\tilde{x}_1 = R_1(e_1, y)$$ [Equation 3]

$$\tilde{x}_2 = R_2(e_2, y, \tilde{x}_1)$$

$$\vdots$$

$$\tilde{x}_n = R_n(e_n, y_n, \tilde{x}_1, \tilde{x}_2, \ldots, \tilde{x}_{n-1})$$

In this case, $\tilde{x}n$ indicates an n-th reconstructed signal, en indicates an n-th prediction error signal, y indicates a context signal, and Rn indicates a non-linear reconstruction function using en and y in order to generate a reconstructed signal.

For example, the non-linear reconstruction function Rn may be defined as the following equation 4.

$$R_1(e_1, y) = P_1(y) + e_1$$ [Equation 4]

$$R_2(e_2, y, \tilde{x}_1) = P_2(y, \tilde{x}_1) + e_2$$

$$\vdots$$

$$R_n(e_n, y, \tilde{x}_1, \ldots, \tilde{x}_{n-1}) = P_n(y, \tilde{x}_1, \tilde{x}_2, \ldots, \tilde{x}_{n-1}) + e_n$$

In this case, Pn indicates a non-linear prediction function including the variables in order to generate a prediction signal.

The non-linear prediction function may be a combination of linear functions in addition to a combination of a median function and a rank order filter and a non-linear function, for example. Furthermore, the non-linear prediction function Pn( ) may be different non-linear functions.

In another embodiment, the encoder 300 and the decoder 400 to which the present invention is applied may include the storage of candidate functions for selecting the non-linear prediction function.

For example, the optimization unit 310 may select an optimized non-linear prediction function in order to generate an optimized transform coefficient. In this case, the optimized non-linear prediction function may be selected from the candidate functions stored in the storage.

The optimization unit 310 may generate an optimized transform coefficient by selecting the optimized non-linear prediction function as described above.

Meanwhile, the output transform coefficient is transmitted to the quantization unit 320. The quantization unit 320 quantizes the transform coefficient and sends the quantized transform coefficient to the entropy encoding unit 330.

The entropy encoding unit 330 may perform entropy encoding on the quantized transform coefficient and output a compressed bitstream.

The decoder 400 of FIG. 4 may receive the compressed bitstream from the encoder of FIG. 3, may perform entropy decoding through the entropy decoding unit 410, and may perform dequantization through the dequantization unit 420. In this case, a signal output by the dequantization unit 420 may mean an optimized transform coefficient.

The inverse transform unit 430 receives the optimized transform coefficient, performs an inverse transform process, and may generate a prediction error signal through the inverse transform process.

The reconstruction unit 440 may obtain a reconstructed signal by adding the prediction error signal and a prediction signal together. In this case, various embodiments described with reference to FIG. 3 may be applied to the prediction signal.

FIG. 5 is an embodiment to which the present invention may be applied and is a schematic flowchart illustrating a CNT(Conditionally Non-linear Transform) coding method.

The encoder may generate a reconstructed signal based on at least one of all of previously reconstructed signals and context signals (S510). In this case, the context signal may include at least one of a previously reconstructed signal, a previously reconstructed intra-coded signal, and another piece of information related to the decoding of a previously reconstructed portion or signal to be reconstructed, of a current frame. The reconstructed signal may be the sum of a prediction signal and a prediction error signal. Each of the prediction signal and the prediction error signal may be generated based on at least one of a previously reconstructed signal and a context signal.

The encoder may obtain an optimized transform coefficient that minimizes an optimization function (S520). In this case, the optimization function may include a distortion component, a rate component and a Lagrange multiplier A. The distortion component may have a difference between the original video signal and a reconstructed signal, and the rate component may include a previously obtained transform coefficient. A indicates a real number that maintains the balance of a distortion component and a rate component.

The obtained transform coefficient experiences quantization and entropy encoding and is then transmitted to the decoder (S530).

Meanwhile, the decoder receives the transmitted transform coefficient and obtains a prediction error vector through entropy decoding, dequantization and inverse transform processes. The prediction unit of the decoder generates a prediction signal using all of samples that have already been reconstructed and available, and may reconstruct a video signal based on the prediction signal and the reconstructed prediction error vector. In this case, the embodiments described in the encoder may be applied to the process of generating the prediction signal.

FIG. 6 is a flowchart illustrating a method for generating an optimal prediction signal based on a Conditionally Non-linear Transform (CNT) coding technique according to an embodiment of the present invention.

The present invention may generate a prediction signal using a previously reconstructed signal and a context signal (S610). For example, the previously reconstructed signal may represent a reconstructed signal defined in the above equation 3. In addition, a non-linear prediction function may be applied to generate the prediction signal, and a different non-linear prediction function may be adaptively applied to each prediction signal.

The prediction signal may be added to a received prediction error signal e(i) (S620) to generate a reconstructed signal (S630). At this point, the step S620 may be performed by an adder (not shown).

The generated reconstructed signal may be stored for future reference (S640). The stored signal may be used to generate a next prediction signal.

As such, by removing restrictions on data which is available in a process of generating a prediction signal, that is, by generating a prediction signal using all previously reconstructed signals, it is possible to provide more enhanced compression efficiency.

FIG. 7 is a diagram illustrating a partition structure of a coding unit according to an embodiment of the present invention.

An encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 7, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 7, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 7(b), CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 7(b), CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 7(b), CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIGS. 3A and 3B, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and, when a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

According to the present invention, the encoder may slit an image into non-square blocks and apply a CNT coding technique to the non-square blocks.

Hereinafter, detailed embodiments thereof will be described.

FIG. 8 is a flowchart illustrating a method for determining whether Non-Square Conditional Non-linear Transform (NSCNT) is applied and determining an optimal block partition according to an embodiment of the present invention.

The present invention proposes a method for processing a target using the NSCNT coding technique.

The NSCNT may indicate applying a CNT coding technique to a non-square block.

The present invention provides a method for applying CNT coding to a non-square block.

The present invention provides a method for applying a CNT prediction mode to a non-square block when one square block is split into two or more non-square blocks.

The CNT prediction mode indicates a mode in which prediction is performed based on a CNT coding technique, and, the CNT prediction mode may be, for example, set based on an intra prediction mode. As a specific example, when the CNT prediction mode is a CNT directional mode, prediction may be performed in a corresponding prediction direction using previously decoded pixel values.

The intra prediction mode may be defined as shown in Table 1, as below.

TABLE 1

| Intra prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

For example, the CNT prediction mode may be defined as shown in Table 2, as below.

TABLE 2

| CNT prediction mode | Associated name |
| --- | --- |
| 0 | CNT_PLANAR |
| 1 | CNT DC(CNT_DC) |
| 2 . . . 34 | CNT_ANGULAR2 . . . CNT_ANGULAR34 |

The above Table 2 is merely an example, and configuration of the CNT prediction mode may be determined based on activity information of an image. The activity information represents information related to edge property of the image, and may include at least one of edge direction information or edge level information. In addition, the edge direction information is information indicating a direction of edges in a block, and the edge level information is intensity information indicating how clear edges in a block are.

In one example, in the case where frequency of activity information is high in a horizontal direction or in a vertical direction, the CNT prediction mode may be defined by the horizontal direction or the vertical direction.

In another example, the CNT prediction mode may be configured to have only some specific modes from among 35 modes. In yet another example, some of 35 prediction modes may be configured as CNT prediction modes, and other modes may be configured as the intra prediction modes shown in FIG. 1.

Referring to FIG. 8, an encoder may perform at least one of the following two loops in order to determine an optimal block partition.

First, the encoder performs at least one of a loop for determining quadtree-based TU partition or a loop for determining a non-square CNT-based block partition (S810, S820).

The loop for determining a quadtree-based Tu partition indicates a loop procedure of searching for an optimal TU partition by performing block partition in a quadtree structure, and the loop for determining a NSCNT-based block partition indicates a look procedure of searching for an optimal block partition in the assumption that NSCNT is applied.

According to a result of the procedure, the encoder may determine an optimal block partition and accordingly be aware of whether or not NSCNT is applied (S830).

For example, in the case where a partition scheme is not determined for each prediction mode or block size, all block partitions may be attempted based on at least one of the two loop procedures and a block partition having the smallest Rate Distortion (RD) cost may be selected as the optimal block partition.

If a non-square CNT-based block partition is determined to be the optimal block partition (that is, non-square CNT is applied, the encoder may perform CNT coding on non-square blocks (S840).

Alternatively, if a quadtree-based TU partition is determined to be the optimal block partition (that is, non-square CNT is not applied), the encoder may perform non-CNT coding on square blocks (S840). The non-CNT coding indicates coding in which CNT is not applied, and may include HEVC standard-based coding.

In addition, the present invention is not limited thereto, and the optimal block partition may be determined to be in a mixed form of a square block and a non-square block. In this case, non-CNT coding may be applied to the square block, and CNT coding may be applied to the non-square block.

In addition, CNT coding may be applied to the square block, and similarly non-CNT coding may be applied to the non-square block. In addition, any other combination is possible.

FIG. 9 is a flowchart illustrating a method for decoding a video signal by applying a non-square CNT according to an embodiment of the present invention.

A decoder may parse CNT configuration information from a bitstream (S910). The CNT configuration information represents configuration information necessary to perform CNT coding. For example, the CNT configuration information may include at least one of a non-square CNT flag indicating whether non-square CNT is applied, block partition information in which non-square CNT is applied, a CNT flag indicating whether a CNT is applied, transmission unit information for transmitting a CNT flag, or a CNT prediction mode set indicating a CNT prediction mode.

In another example, when a method in which non-square CNT is applied is fixed according to a prediction mode, a block size, TU/PU partition information, etc., only a CNT flag indicating whether a CNT is applied may be transmitted and other configuration information or additional information may not need to be transmitted. The method by which non-CNT is applied may, for example, include a block partition to which non-square CNT is applied.

The decoder may induce a non-square CNT block partition based on at least one of the CNT configuration information (S920). When a block partition is able to be changed based on at least one of the CNT configuration information, the operation S920 may be needed.

In addition, other additional information may be further needed in addition to the CNT configuration information. For example, a 16×16 block is able to be partitioned into two or four non-square blocks in a horizontal direction, a partition index indicating one of the two partition types may be needed, and the decoder may receive the partition index as additional information and use the partition index to induce a block partition.

However, when the block partition information in which non-square CNT is applied is transmitted to the decoder, this operation may be omitted.

The decoder may perform CNT decoding on a non-square CNT block partition (S930).

FIG. 10 is a diagram illustrating a method for performing prediction by applying the same prediction mode to non-square blocks according to an embodiment of the present invention.

The present invention provides a method for applying non-square CNT by fixing a different non-square block partition for each prediction mode.

The present invention provides a method for additionally transmitting non-square block partition information.

The present invention provides a method for applying CNT coding on a non-square block. For example, prediction of each pixel may be performed using a reconstructed pixel value of a neighboring pixel. In addition, separable 1D transform may be applied to a residual signal in a row direction and in a column direction. This is the same as in the case where CNT is applied to a square block. However, a non-square block has different length in row and in column, and thus, different 1D transform may be applied to the non-square block in the row direction and the column direction.

The present invention may apply non-square CNT by spiting into two or more non-square blocks according to a prediction direction or a prediction mode.

For example, FIG. 10(a) shows the case where a block is split into two non-square blocks in a vertical direction according to a prediction mode M, and FIG. 10(b) shows the case where a block is split into four non-square blocks in a vertical direction according to a prediction mode M. Non-square CNT prediction may be applied to the non-square blocks. The non-square CNT prediction indicates performing prediction on a non-square block using a CNT coding technique.

As such, non-square CNT prediction may be performed on non-square blocks based on the same prediction mode or prediction direction.

In the case of CNT coding, when an attempt is made to obtain reconstructed pixels, residual values are accumulated and added to a predictor, and thus, as shown in FIG. 10, error propagation may be prevented as a depth to which residuals are accumulated is reduced by splitting into non-square blocks.

FIG. 11 is a diagram for explaining a method for performing prediction by applying different prediction modes to non-square blocks according to an embodiment of the present invention.

The present invention provides a method for applying prediction modes of different coding types to a plurality of non-square blocks in a square block.

For example, when one square block is partitioned into a plurality of non-square blocks, a different prediction mode, rather than the same prediction mode, may be applied to each non-square block.

For example, FIG. 11(a) shows the case where one square block is split into two non-square blocks in a vertical direction, and non-square CNT prediction may be performed on a left (first) non-square block according to a prediction mode M1, and non-square CNT prediction may be applied to a right (second) non-square block according to a prediction mode M2.

FIG. 11(b) shows the case where one square block is split into four non-square blocks in a vertical direction, and non-square CNT prediction may be performed on a first non-square block according to the prediction mode M1, intra prediction (non-CNT coding) may be performed on a second non-square block according to the prediction mode 2, non-square CNT may be performed on a third non-square block according to a prediction mode M3, and intra prediction (non-CNT coding) may be performed on a fourth non-square block according to a prediction mode M4. In this case, the prediction modes M1, M2, M3, and M4 may have different prediction mode values. However, the present invention is not limited thereto, and the prediction modes may have the same value or at least two of the prediction modes may have different values.

In an embodiment, when the non-square blocks are PUs, a CNT flag indicating whether a CNT is applied to each PU may be transmitted. In this case, CNT prediction and intra prediction may be applied in combination to the PUs.

FIG. 12 is a diagram illustrating a method for partitioning one square block into two or more non-square blocks according to an embodiment of the present invention.

Referring to FIG. 12, FIG. 12(a) shows a square block, FIG. 12(b) shows the case where one square block is partitioned into two non-square blocks in a vertical direction, FIG. 12(c) shows the case where one square block is partitioned into four non-square blocks in the vertical direction, FIG. 12(d) shows the case where one square block is partitioned into two non-square blocks in a horizontal direction, and FIG. 12€ shows the case where one square block is partitioned into four non-square blocks in the horizontal direction.

The present invention may signal block partition information, which indicates into how many square blocks one square block is partitioned in which direction, as additional information. For example, the block partition information may indicate an index corresponding to one of available block partitions.

In addition, the present invention may use a fixed block partition for a specific mode. For example, in the case of a vertical mode or a horizontal mode, any one of the block partitions shown in FIG. 12 may be fixed and applied. However, the block partitions shown in FIG. 12 are merely examples, and a square block may be split into a more number of non-square blocks, may be split asymmetrically, and may be split into an odd number of non-square blocks.

In addition, a block partition having statistically good performance may be determined for each prediction mode, and such a block partition may be used in a fixed manner.

FIG. 13 is a diagram illustrating a method for partitioning one square block into two or more non-square blocks in a prediction direction according to an embodiment of the present invention.

The present invention may apply a different block partition according to a prediction direction or a prediction mode.

The present invention provides a method for performing CNT prediction on a non-square block by splitting a block in a vertical direction in the case of horizontal directional prediction and in a horizontal direction in the case of vertical directional prediction.

Referring to FIG. 13, FIG. 13(a) shows block partition being performed in the horizontal direction when prediction is performed in the vertical direction, and FIG. 13(b) shows block partition being performed in the vertical direction when prediction is performed in the horizontal direction.

For example, intra prediction modes (or CNT prediction modes) 2 to 17 are horizontal directional prediction so a horizontal directional block partition may be applied thereto, as shown in FIG. 13(a), and intra prediction modes (or CNT prediction modes) 19 to 34 are vertical directional predictions so vertical directional block partition may be applied thereto, as shown in FIG. 13(b).

In another embodiment, the present invention provides a method for performing CNT prediction on a non-square block by splitting a block in the horizontal direction in the case of horizontal directional prediction and in the vertical direction in the case of vertical directional prediction.

For example, the intra prediction modes (or CNT prediction modes) 2 to 17 are horizontal directional prediction so vertical directional block partition may be applied thereto, and the intra prediction modes (or CNT prediction modes) 19 to 34 are vertical directional prediction so a horizontal directional block partition may be applied thereto.

In addition, in the case of an intra planar mode (or CNT planar mode), intra Dc mode (or CNT DC mode), or intra angular mode (or CNT angular mode) 18, any block partition may be applied. For example, at least one of splitting into square blocks or splitting into non-square blocks may be applied.

In addition, the present invention may fix a block partition corresponding to each prediction mode, and additionally transmit a flag indicating whether to split on the basis of a block unit.

In another embodiment, the present invention may apply CNT coding to a non-square TU.

In yet another embodiment, the present invention may differently split blocks, to which non-square CNT is applied, according to a size of a target block.

In one example, it may be set such that a 8×8 block is split into two non-square blocks, as shown in FIGS. 12(b) and (d) and a 16×16 block is split into four non-square blocks, as shown in FIGS. 12(c) and (e).

In another example, when a 8×8 block is able to be split as shown in FIGS. 12(a), (b), and (d), and a 16×16 block is able to be split as shown in FIG. 12(a), (b), (c), (d), and (e), block partition information exhibiting performance optimized for each block may be transmitted additionally.

In addition, embodiments described in this specification may be applied in combination.

FIG. 14 is a flowchart illustrating a method for performing CNT prediction coding on non-square blocks according to an embodiment of the present invention.

An encoder may perform a block partition on a target unit of a video signal (S1410). The block partition may be performed based on a square partition or non-square partition.

When the target unit is partitioned into a plurality of non-square blocks, the encoder may determine an optimal block partition based on RD cost (S1420).

In one embodiment, the optimal block partition may be determined based on a prediction direction or a prediction mode. For example, when the prediction direction or the prediction mode represents a horizontal direction, the optimal block partition may be determined to be a vertical directional block partition, and, when the prediction direction or the prediction mode represents a vertical direction, the optimal block partition may be determined to be a horizontal directional block partition.

The encoder may perform CNT prediction coding on a non-square block partitioned based on the optimal block partition (S1430). The CNT prediction coding represents performing prediction using all previously decoded pixel values.

In one embodiment, when the CNT prediction coding is performed, the same prediction mode may be applied to the plurality of non-square blocks.

In one embodiment, when the CNT prediction coding is performed, different prediction modes may be applied to at least two of the plurality of non-square blocks.

When performing CNT prediction coding on a non-square block, the encoder may signal a non-square CNT flag which indicates whether a CNT prediction coding is performed on the non-square block.

In one embodiment, the non-square CNT flag may be signaled through at least one of a Sequence Parameter Set (SPS), a Picture Parameter Set (PPS), a picture, a CTU, a CU, a PU, or a block.

FIG. 15 is a flowchart illustrating a method for performing CNT prediction coding based on a non-square CNT flag according to an embodiment of the present invention.

A decoder may parse a non-CNT flag for a target unit from a video signal (S1510). The non-square CNT flag indicates whether CNT prediction coding is performed on a non-square block.

The decoder may perform CNT prediction coding on the target unit based on the non-square CNT flag (S1520). The target unit is composed of a plurality of non-square blocks.

In one embodiment, when the CNT prediction coding is performed, the same prediction mode may be applied to the plurality of non-square blocks.

In one embodiment, when the CNT prediction coding is performed, different prediction modes may be applied to at least two of the plurality of non-square blocks.

In one embodiment, the decoder may parse CNT configuration information necessary to perform CNT coding. The CNT configuration information may include at least one of block partition information in which non-square CNT is applied, a CNT flag indicating whether a CNT is applied, transmission unit information for transmitting a CNT flag, or a CNT prediction mode set indicating a CNT prediction mode.

As described above, the embodiments described in the present invention may be performed by implementing them on a processor, a microprocessor, a controller or a chip. For example, the functional units depicted in FIGS. 1, 2, 3 and 4 may be performed by implementing them on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for encoding a video signal, comprising:
performing block partition for a target unit of the video signal, wherein the block partition is performed based on at least one of a square partition or a non-square partition;
determining an optimal block partition based on a Rate Distortion (RD) cost when the target unit is partitioned into a plurality of non-square blocks; and
performing a Conditionally Non-linear Transform (CNT) prediction coding on a non-square block partitioned based on the optimal block partition,
wherein the CNT prediction coding comprises performing prediction using all previously decoded pixel values,
wherein 1-dimensional (1D) separable transforms are applied to the non-square block on which the CNT prediction coding is performed, and
wherein different 1D transforms having different lengths are applied in each of a row direction and a column direction of the non-square block.

2. The method of claim 1, wherein a same prediction mode is applied to the plurality of non-square blocks.

3. The method of claim 1, wherein different prediction modes are applied to at least two of the plurality of non-square blocks.

4. The method of claim 1, wherein the optimal block partition is determined based on a prediction direction or a prediction mode.

5. The method of claim 4, wherein:
when the prediction direction or the prediction mode represents a horizontal direction, the optimal block partition is determined to be a vertical directional block partition, and
when the prediction direction or the prediction mode represents a vertical direction, the optimal block partition is determined to a horizontal directional block partition.

6. The method of claim 1, further comprising:
signaling a CNT flag which indicates whether the CNT prediction coding is performed on the non-square block.

7. The method of claim 6, wherein the non-square CNT flag is signaled in at least one level of a Sequence Parameter Set (SPS), a Picture Parameter Set (PPS), a picture, a Coding Tree Unit (CTU), a Coding Unit (CU), a Prediction Unit (PU), or a block.

8. A method for decoding a video signal, comprising:
parsing a non-square Conditionally Non-linear Transform (CNT) flag for a target unit from a video signal, wherein the non-square CNT flag indicates whether a CNT prediction coding is performed on a non-square block; and
performing the CNT prediction coding on the target unit based on the non-square CNT flag, wherein the target unit is composed of a plurality of non-square blocks,
wherein the CNT prediction coding comprises performing prediction using all previously decoded pixel values according to CNT prediction modes,
wherein 1-dimensional (1D) separable transforms are applied to the non-square block of the target block on which the CNT prediction coding is performed, and
wherein different 1D transforms having different lengths are applied in each of a row direction and a column direction of the non-square block.

9. The method of claim 8, wherein a same prediction mode is applied to the plurality of non-square blocks.

10. The method of claim 8, wherein different prediction modes are applied to at least two of the plurality of non-square blocks.

11. The method of claim 8, wherein block partition of the target unit is determined based on a prediction direction or a prediction mode.

12. The method of claim 11, wherein:
when the prediction direction or the prediction mode represents a horizontal direction, the block partition of the target unit is composed of vertical directional block partitions, and
when the prediction direction or the prediction mode represents a vertical direction, an optimal block partition is composed of horizontal directional block partitions.

13. The method of claim 8, further comprising:
parsing CNT configuration information, which is used to perform a CNT coding, from the video signal,
wherein the CNT configuration information comprises at least one of block partition information in which non-square CNT is applied, a CNT flag indicating whether a CNT is applied, or a CNT prediction mode set indicating a CNT prediction mode.

14. An apparatus for encoding a video signal, comprising:
a processor configured to:
perform block partition on a target unit of the video signal;
when the target unit is partitioned into a plurality of non-square blocks, determine an optimal block partition based on Rate Distortion (RD) cost; and
perform Conditionally Non-linear Transform (CNT) prediction coding on a non-square block partitioned based on the optimal block partition,
wherein the block partition is performed based on at least one of a square partition or a non-square partition, and
wherein the CNT prediction coding comprises performing prediction using all previously decoded pixel values,
wherein 1-dimensional (1D) separable transforms are applied to the non-square block on which the CNT prediction coding is performed, and
wherein different 1D transforms having different lengths are applied in each of a row direction and a column direction of the non-square block.

15. An apparatus for decoding a video signal, comprising:
a processor configured to:
parse a non-linear Conditionally Non-linear Transform (CNT) flag for a target unit, which is composed of a plurality of non-square blocks, from the video signal; and
perform CNT prediction coding on the target unit based on the non-square CNT flag,
wherein the non-square CNT flag indicates whether a CNT prediction coding is performed on a non-square block, and
wherein the CNT prediction coding comprises performing prediction using all previously decoded pixel values according to CNT prediction modes,
wherein 1-dimensional (1D) separable transforms are applied to the non-square block of the target block on which the CNT prediction coding is performed, and wherein different 1D transforms having different lengths are applied in each of a row direction and the column direction of a non-square block.

* * * * *